United States Patent [19]
Buxton et al.

[11] Patent Number: 5,518,222
[45] Date of Patent: May 21, 1996

[54] NOZZLE ARRANGEMENT FOR USE IN A COOLING ZONE OF ROLLING MILL

[75] Inventors: William Buxton; Edward R. Cone, both of Northport, Ala.

[73] Assignee: Tuscaloosa Steel Corporation, Tuscaloossa, Ala.

[21] Appl. No.: 331,100

[22] Filed: Oct. 28, 1994

[51] Int. Cl.$^6$ ...................................................... C21D 1/00
[52] U.S. Cl. ............................................ 266/114; 266/259
[58] Field of Search ...................................... 266/259, 249, 266/114, 113; 239/589, 590

[56] References Cited

U.S. PATENT DOCUMENTS

| | | | |
|---|---|---|---|
| Re. 25,447 | 9/1963 | Hjulian | 239/590 |
| 477,824 | 6/1892 | Robinson | 239/590 |
| 2,408,588 | 10/1946 | Watts | 158/27.4 |
| 3,062,456 | 11/1962 | Thompson et al. | 239/590 |
| 3,486,700 | 12/1969 | Bristow | 239/590 |
| 4,047,985 | 9/1977 | Greenberger | 148/153 |
| 4,055,305 | 10/1977 | Schwinn | 239/524 |
| 4,365,758 | 12/1982 | Schaming | 239/590 |
| 4,629,165 | 12/1986 | Rothe et al. | 266/259 |
| 5,158,235 | 10/1992 | Johnson | 239/590 |

*Primary Examiner*—Scott Kastler
*Attorney, Agent, or Firm*—Bacon & Thomas

[57] ABSTRACT

An improved nozzle arrangement for use in a cooling zone of a rolling mill is formed completely of plastic, preferably ABS plastic, and includes an elongated, substantially cylindrical hollow body portion that defines an longitudinally extending conduit having a cooling fluid intake port that smoothly converges into an internal flow channel of an integrally formed head portion that is provided with a cooling fluid outlet port. An elongated baffle member is positioned within the cylindrical body portion and extends substantially the entire length thereof. The baffle member itself is formed of a unitary plastic member, also preferably ABS plastic, and has a X-shaped cross-section. Constructing the nozzle of plastic saves considerable replacement costs associated with the use of such nozzles in rolling mills and also enables the nozzles to be recycled. In addition, due to the specific construction of the nozzle, laminar flow is assured which enhances its cooling function.

7 Claims, 5 Drawing Sheets

NOZZLE ARRANGEMENT FOR USE IN A COOLING ZONE OF ROLLING MILL

BACKGROUND OF THE INVENTION

1. Field of the Invention

The present invention pertains to a rolling mill that includes a roller assembly through which a heated piece of metal is passed in order to produce a progressively thinned and elongated metal sheet which is then cooled and, more particularly, to a nozzle arrangement for use in directing a flow of cooling fluid upon a heated sheet of metal in a rolling mill.

2. Discussion of the Prior Art

Rolling mills are commonly used for producing elongated metal sheets for various applications. In general, such rolling mills receive a slab of metal which is heated and is caused to pass between at least one pair of rollers of a roller assembly in order to thin and lengthen the metal slab. In certain known types of rolling mills, the slab is serially passed through various roller assemblies in a heated state. Each of these roller assemblies have associated spacings through which the metal slab passes which are progressively made smaller such that the slab is continually thinned as it passes through the rolling mill until an elongated metal sheet is produced. The elongated metal sheet can then be wrapped by means of a coiler for various uses:

Due to the number of and required spacing between the various roller assemblies in such a rolling mill, it has also been heretobefore proposed to produce an elongated metal sheet from a metal slab by utilizing a reverse rolling or steckel mill. FIG. 1 schematically illustrates a typical milling operation incorporating a steckel mill. This milling system, generally indicated at 1, receives a supply of metal from a continuous casting machine 5. Instead of continuous casting machine 5, a slab of metal can also be introduced into the milling system 2 upon a conveyor indicated at 7. Conveyer 7 delivers the metal through a heating furnace 9 and, if necessary, through a roughing roller-type mill unit 11. In some applications, roughing roller-type mill 11 is made reversible such that the slab or metal can be passed therethrough various times in order to obtain a slab having a certain thickness which is then passed to the steckel mill generally indicated at 15. Once the metal is elongated into a sheet in steckel mill 15, it proceeds to a cooling zone 18 and then is delivered over a guide roller 21 to a coiling device 24.

Steckel mill 15 typically includes first and second coil furnaces located within housings 28 and 29. Housings 28 and 29 each rotatably house a drum 32, 33 which are adapted to alternatively coil and uncoil a strip of metal indicated at 38. Metal strip 38, for instance, extends through an opening 40 in first housing 28, between rollers of a guide unit 42, between the rollers of a rolling mill assembly generally indicated at 46, through a second guide roller unit 48 and into second housing 29 through an opening 50. As is known in the aft, the area through which strip 38 must pass within rolling mill assembly 46 is adjustable such that, as strip 38 is repeatedly passed through milling roller assembly 46 and alternatively coiled within housings 28 and 29, the thickness of strip 38 is systematically reduced commensurate with the elongation of strip 38. In order to maintain strip 38 in a flexible state for coiling and to enable strip 38 to be thinned out as it is passed through milling roller assembly 46, each housing 28 and 29 includes a coil furnace as discussed above to heat strip 38.

For this purpose, known steckel mills generally incorporate a plurality of burners which operate at a temperature in the order to 2000°–3000° F. Therefore, the temperature of the sheet that passes from steckel mill 15 to cooling zone 18 is extremely hot and must be sufficiently cooled down prior to delivery to coiling device 24. Sheets of metal produced in other types of rolling mills are similarly heated, although perhaps to a lower extent, and subsequently cooled as well.

It is known in the milling art to deliver the hot sheet of metal between upper and lower banks of nozzles through which cooling fluid is sprayed unto the upper and lower surfaces of the metal sheet within cooling zone 18. As illustrated in FIGS. 2a–2c, such known nozzles are generally formed from various components. More specifically, each nozzle 50 includes a head portion 53, a substantially cylindrical body portion 57 and a plurality of baffle or diffuser members 60, 61. The head portion 53 includes a terminal end 65 that is formed with a plurality of flats 68 for receiving a tool for securing nozzle 50 to a header (not shown). For this purpose, head portion 53 is also formed with a threaded portion 70, adjacent terminal end 65, which is adapted to be threadably secured to a respective header.

The cylindrical body portion 57 is crimped to head portion 53 at 74 when an annular rim 76 of cylindrical body portion 57 is seated against a plateau 78 formed in head portion 53. Baffle member 60 is positioned within cylindrical body portion 57 and abuts annular edge 80 of head portion 53 and baffle member 61 is located adjacent a flared end 83 of cylindrical body portion 57 as best shown in FIG. 2b.

This known nozzle construction suffers from various drawbacks. First, head portion 53 is currently made of brass and cylindrical body portion 57 of copper. Therefore, these components need to be assembled and, due to the extreme temperatures and corrosive environment to which nozzles 50 are subjected in the rolling mill, nozzles 50 need to be replaced on a regular basis. Due to the construction and materials from which the known nozzles are made, replacement is extremely expensive. In fact, a typical mill generally utilizes in the order of 1500–2000 such nozzles within cooling zone 18, and with this known construction, replacement of each nozzle generally runs in the order of several hundred dollars if purchased individually. Of course, the cost can be substantially reduced if the nozzles are purchased in large quantities. A typical rolling mill constructed in the manner set forth above and utilizing the known nozzles consumes approximately 1500 nozzles a year. Therefore, periodic replacement of the nozzles represents a substantial financial expenditure.

Second, it is extremely desirable to maintain a laminar flow through each nozzle 50 such that the spacing between adjacent nozzles can be accurately determined in order that the sheet metal can be evenly cooled. This does not occur with the known nozzle construction of FIGS. 2a–2c. Instead, turbulences are created due to the presence of annular edge 80, which represents an abrupt diameter change between the flow of cooling fluid from within cylindrical body portion 57 to head portion 53, and the spacing of baffle members 60, 61 which often leads to non-laminar flow changes therebetween.

Based on the above, there exists in the art of rolling mills, and particularly in a cooling zone thereof, a need for a nozzle arrangement which is constructed in a manner which will enable a laminar flow of cooling fluid therethrough to be maintained and which represents a relatively inexpensive alternative to known nozzle arrangements in this field.

SUMMARY OF THE INVENTION

The present invention provides an improved nozzle arrangement for use in a cooling zone of a rolling mill. More specifically, the nozzle arrangement of the invention is formed completely of plastic, preferably ABS plastic, and includes an elongated, substantially cylindrical hollow body portion that defines a longitudinally extending conduit having a cooling fluid intake port that smoothly converges into an internal flow channel of an integrally formed head portion that is provided with a cooling fluid outlet port. An elongated baffle member is positioned within the cylindrical body portion and extends substantially the entire length thereof. The baffle member itself is formed of a unitary plastic member, also preferably of ABS plastic, and has a X-shaped cross-section. In a manner analogous to that of the prior art, the head portion of the nozzle arrangement of the present invention is integrally formed with a plurality of tool receiving flats and an externally threaded portion for securing the nozzle arrangement to a cooling header.

By forming the nozzle arrangement of the present invention from plastic, substantial cost savings are achieved over the prior art nozzle arrangements utilized in this environment. For instance, the cost of producing each nozzle arrangement is reduced to approximately a few dollars in accordance with the present invention. In addition, by providing a smooth transition between the interior surface of the cylindrical body portion and the internal flow channel of the head portion of the nozzle arrangement, as well as providing the baffle member that extends substantially the entire length of the conduit defined within the cylindrical body portion, a flow of cooling fluid directed through the nozzle arrangement of the present invention will remain in a laminar state which results in an enhanced cooling system. Surprisingly, it has been found that the plastic nozzle arrangement of the present invention has a useful life substantially the same as that of the known prior art nozzle arrangements and, since the nozzle arrangement of the invention is formed from plastic, the entire nozzle arrangement is recyclable.

Other, features and advantages of the present invention will become more readily apparent from the following detailed description of a preferred embodiment thereof when taken in conjunction with the drawings wherein like reference numerals refer to corresponding parts and several views.

BRIEF DESCRIPTION OF THE DRAWINGS

FIG. 2c is a cross-sectional view of a diffuser incorporated in the nozzle arrangement of FIG. 2a;

FIG. 3b is a perspective view of an elongated baffle member incorporated in the nozzle arrangement of 3a;

DETAILED DESCRIPTION OF THE PREFERRED EMBODIMENT

Figure 3A:
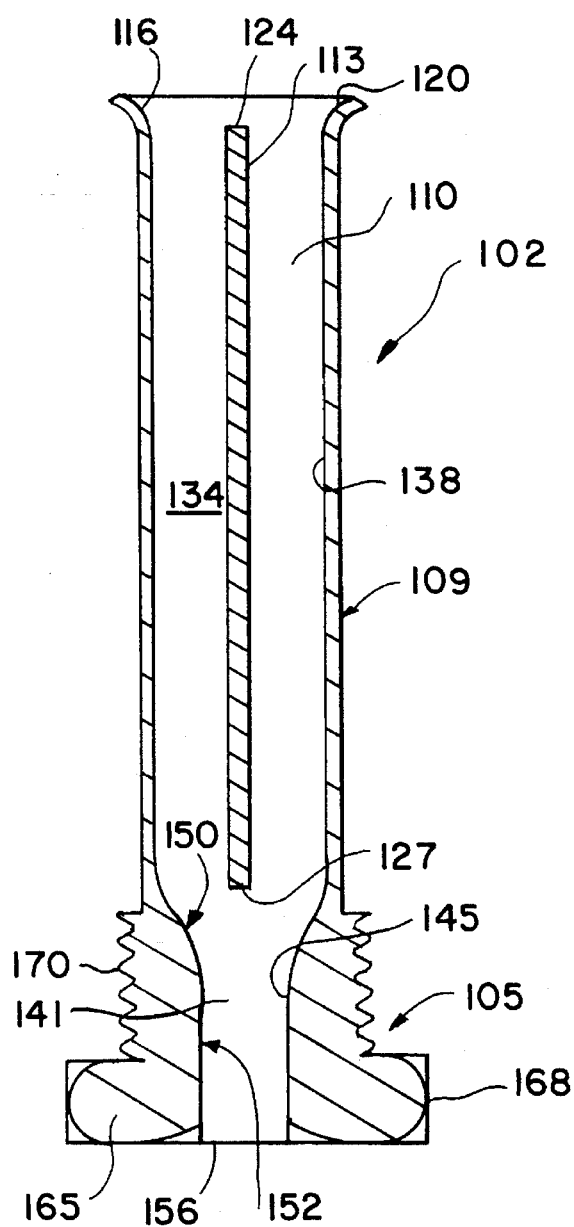
FIG. 3a is a cross-sectional view of a nozzle arrangement constructed in accordance with the present invention.
Figure 3B:
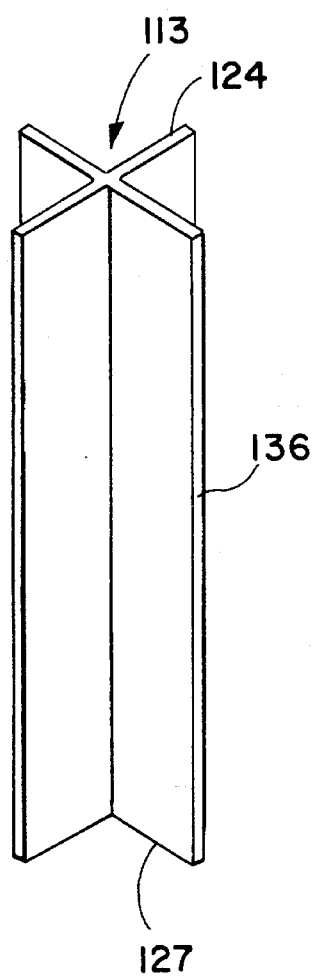

With initial reference to FIGS. 3a and 3b, the nozzle of the present invention is generally indicated at 102 and includes a head portion 105 that is integrally formed with a cylindrical body portion 109. In the preferred embodiment, nozzle 102 is injection molded from ABS plastic. Cylindrical body portion 109 defines a longitudinally extending conduit 110 within which is positioned an elongated baffle member 113.

More specifically, cylindrical body portion 109 includes a first flared end 116 that defines a cooling fluid intake port 120 that opens into conduit 110. Elongated baffle member 113 includes a first end 124 that is positioned directly adjacent intake port 120 and a second end 127 which terminates directly adjacent a second end portion 13 1 of cylindrical body portion 109. As best shown in FIG. 3b, elongated baffle member 113 is preferably X-shaped in cross-section so as to define four circumferentially spaced and equally sized flow channels 134 (see FIG. 3a). Elongated baffle member 113 is preferably press-fit within conduit 110 such that the outermost radial ends 136 of elongated baffle member 113 engage inner surface 138 of cylindrical body portion 109.

Conduit 110 of cylindrical body portion 109 leads into an internal flow channel 141 defined by an inner surface portion 145 of head portion 105. More specifically, internal flow channel 141 includes a converging section 150 and a uniform diametric section 152 that leads to a fluid outlet port 156.

Figure 1:
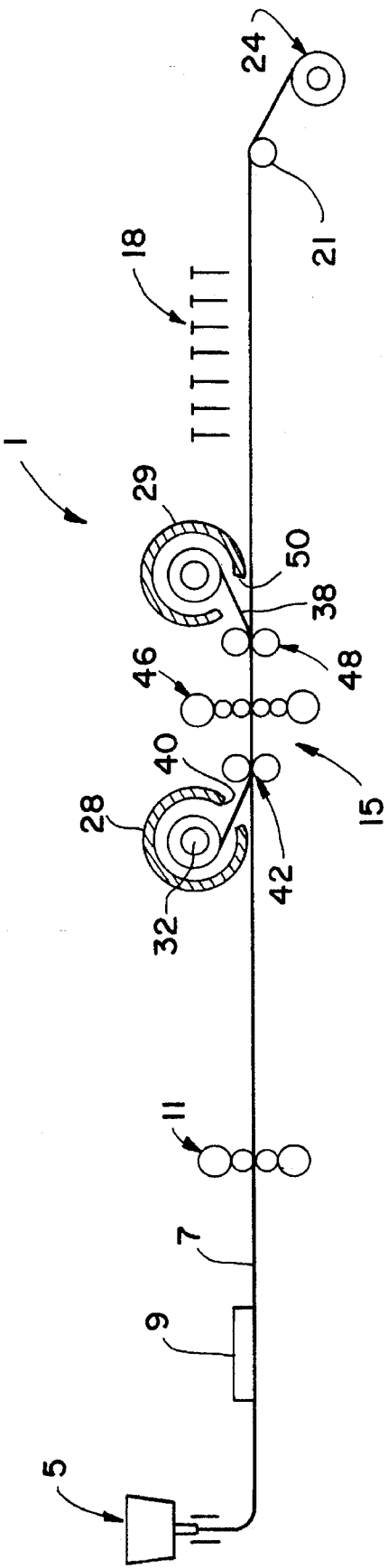
FIG. 1 is a schematic illustration of a known milling process within which the nozzle arrangement of the present invention is incorporated.
Figure 2A:
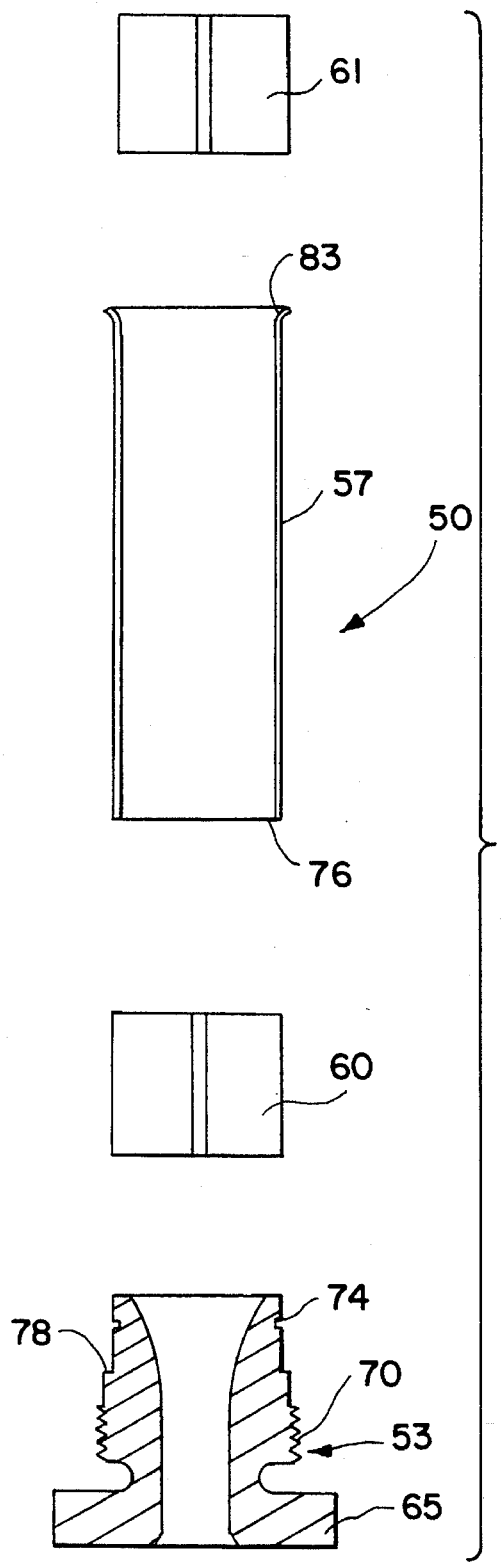
FIG. 2a is an exploded view of a conventional nozzle arrangement.
Figure 2B:
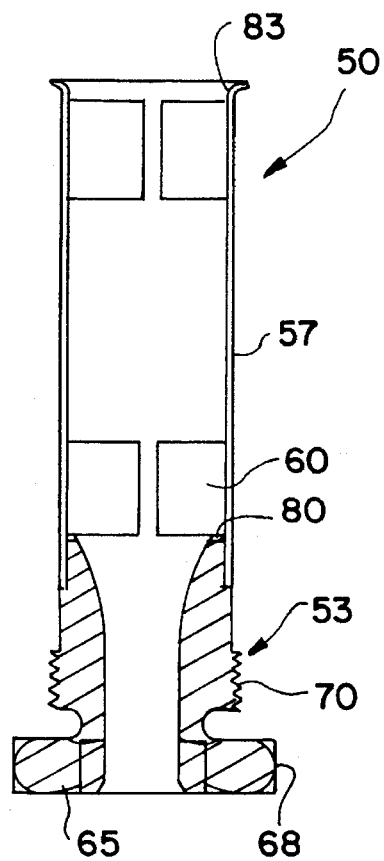
FIG. 2b is a cross-sectional view of the nozzle arrangement of FIG. 2a in an assembled state.
Figure 2C:
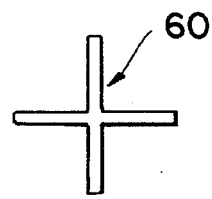

As mentioned briefly above and which will be more fully discussed below, nozzle 102 is adapted to receive a flow of cooling fluid that enters intake port 102 of conduit 110, flows through channels 134 defined between elongated baffle member 113 and inner surface 138 of cylindrical body portion 109 and is then directed into internal flow channel 141, through fluid outlet port 156 and against a heated metal sheet (not shown) for cooling the same. In the preferred embodiment, the mold utilized in forming nozzle 102 is highly polished such that inner surface 138, as well as inner surface portion 145, is extremely smooth. The same is true of the services of elongated baffle member 113. By providing the smooth surfaces, as well as the smooth transition between conduit 110 and converging section 150 of internal flow channel 141, a flow through nozzle 102 can be achieved which is substantially, completely laminar in nature. This represents a significant advantage over the nozzle arrangements known in the prior art as discussed above with reference to FIGS. 2a–2c wherein abrupt changes between the various components created turbulences in the water flow.

Head portion 105 is formed with an enlarge terminal end 165 that is preferably formed with a plurality of flats, one of which is indicated on 168, and an externally threaded portion 170. In a manner analogous to that of the nozzle arrangement of the prior art, nozzle 102 is adapted to be secured to a cooling header (not shown in these Figures) with threaded portion 170 being threadably secured to the header and tightened thereto by means of a tool which is placed about terminal end 165 and which engages flats 168. The only real difference between the threaded connection associated with the prior an nozzle 50 of FIGS. 2a–2c and nozzle 102 is that, due to the material from which nozzle 102 is preferably formed, it has been found that no gasket is required at the juncture between terminal end 165 and threaded portion 170 in order to provide a sealed connection between nozzle 102 and a header.

Figure 4:
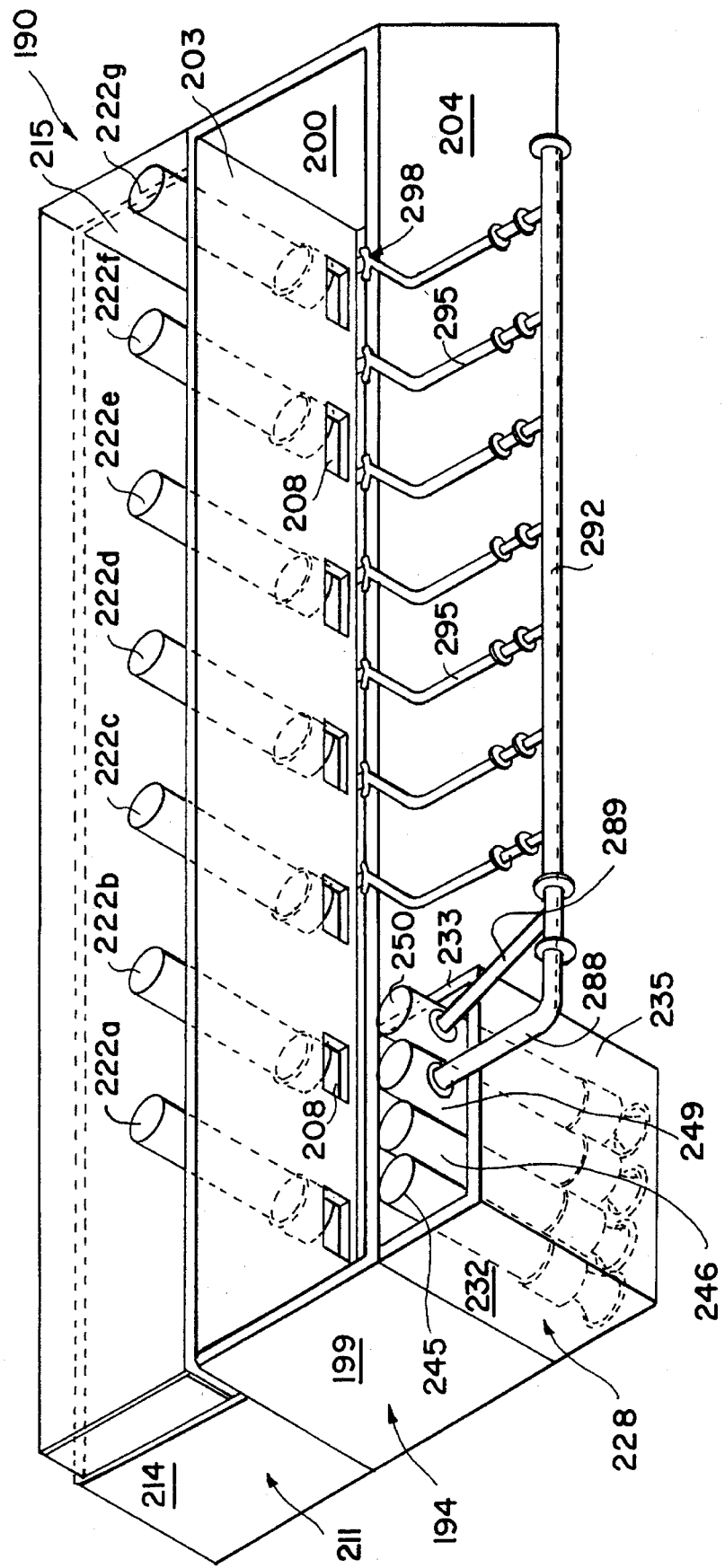
FIG. 4 illustrates a portion of a cooling system for a rolling mill that incorporates the nozzle arrangement of the present invention.
Figure 5:
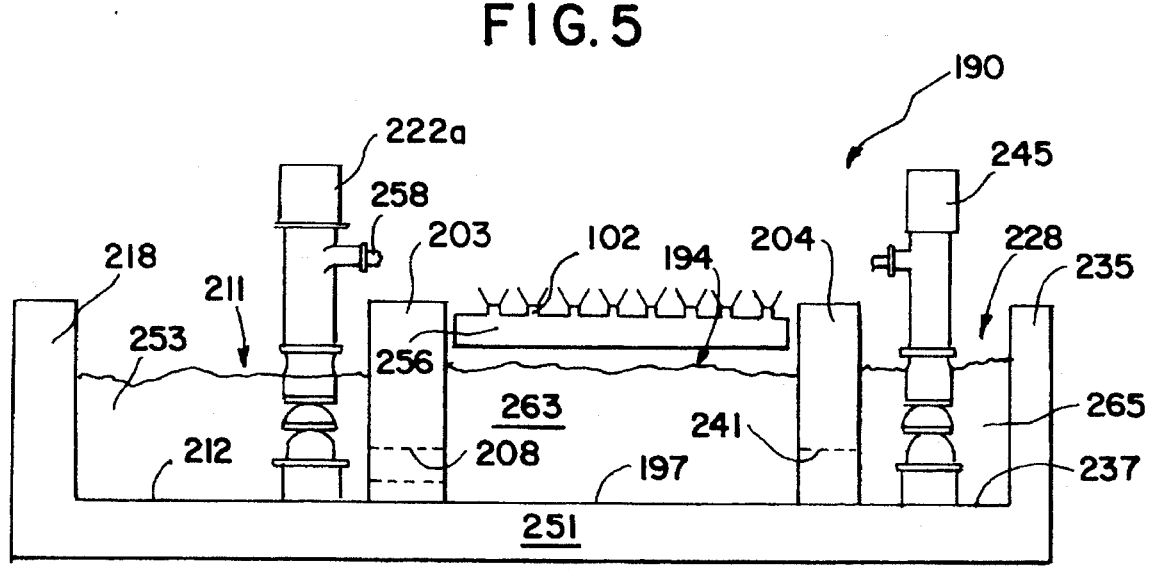
FIG. 5 is a schematic end view of the cooling arrangement of FIG. 4.
Figure 6:
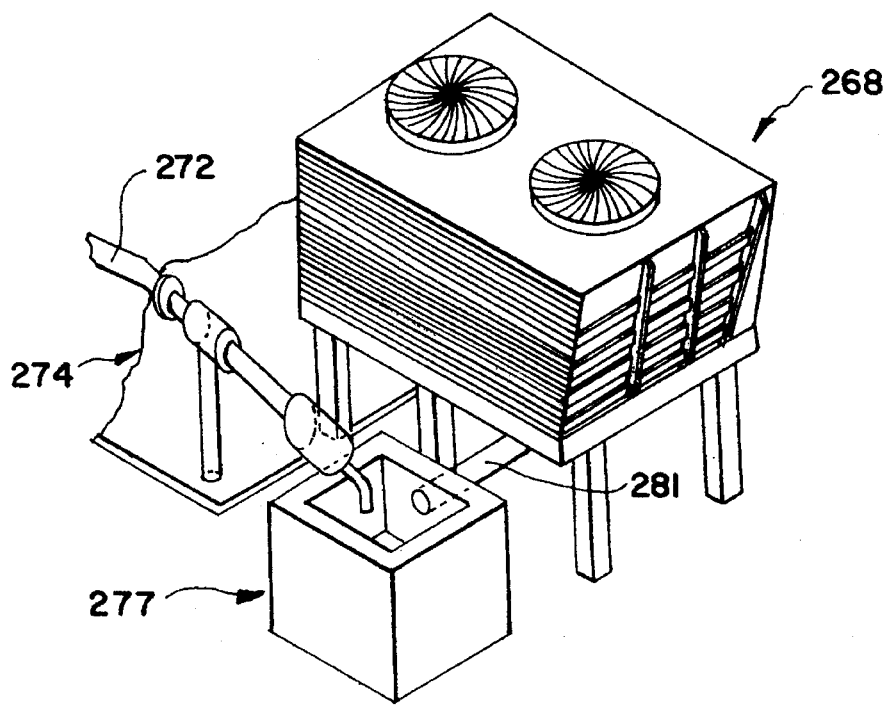
FIG. 6 illustrates a heat exchanger arrangement utilized in combination with the cooling system of FIG. 4.

Reference will now be made to FIGS. 4–6 in describing a preferred cooling system for a rolling mill within which nozzle 102 is incorporated. With initial reference to FIGS. 4 and 5, a cooling assembly generally indicated at 190 includes a first elongated container 194 defined by a bottom 197, end walls 199, 200 and elongated sidewalls 203 and 204. Spaced upwardly from bottom 197, elongated sidewall 203 is formed with a plurality of longitudinally spaced slots 208 which open into a second elongated container 211. Second elongated container 211 is defined by a bottom 212, longitudinally spaced end walls 214, 215, elongated sidewall 203 and a terminal side wall 218. Mounted to bottom 212 of second elongated container 211 is a plurality of longitudinally spaced pumps 222a–222g. Cooling assembly 190 further includes a third container 228 that extends for a predetermined distance along first elongated container 194 and which is defined by end walls 232, 233, sidewalls 204 and 235, and bottom 237.

For the sake of completeness, according to a preferred construction of cooling assembly 190, first and second containers 194 and 211 are approximately 164 feet in length and have a height of approximately 8.5 feet. The entire cooling assembly 190 includes a base 251 that is 1.5 feet thick. In this preferred embodiment, sidewalls 204 and 218 are 1.5 feet thick, sidewall 203 is 2 feet thick and sidewall 235 is 1 foot thick. Finally, first container 194 is approximately 9 foot wide, second container 211 is approximately 7.5 feet wide and third container 228 is approximately 4 foot wide. Of course, these dimensions are only presented as a preferred embodiment and can vary greatly depending upon the size of sheet metal being produced, as well as the capacity of the rolling mill itself.

As best shown in FIG. 5, elongated sidewall 204 is formed with at least one enlarged through hole 241 that extends from adjacent bottom 237 and fluidly interconnects first and third containers 194 and 228. Within third container 228 is mounted first and second recirculating pumps 245, 246 and first and second side pumps 249, 250. The function of each of these pumps as well as the overall operation of cooling assembly 190 will now be described below with reference to each of FIGS. 4–6. Second container 211 houses a supply of cooling fluid 253, preferably water, which is drawn through pumps 222a–222g to a plurality of headers, one of which is indicated in FIG. 5 at 256. In the preferred embodiment, each header 256 has secured thereto thirty-eight nozzles 102 which extend between sidewalls 203 and 204. Each pump 222a–222g actually supplies cooling fluid 253 by means of outlet pipe 258 to a manifold (not shown) which transfers the pumped fluid to a plurality of headers 256. In the preferred embodiment, each pump 222a–222g supplies a bank of headers 256 with each bank including six headers. Therefore, in the preferred embodiment, seven banks, one for each pump 222a–222g are provided with each bank including six headers. With thirty-eight nozzles 102 per header 256, a total of 1596 nozzles 102 are utilized in cooling assembly 190.

Header 256 as depicted in FIG. 5 is adapted to be positioned below a conveyor (not shown) arranged over first container 194 and upon which a sheet of metal that has been heated, significantly reduced in thickness and elongated and which needs to be cooled prior to being coiled is supported. In general, such conveyor arrangements are known in the art and comprise, for instance, rollers which have rather large gaps therebetween which enable the cooling fluid 253 to be ejected upon the surface of the metal sheet for cooling purposes. In addition, although not shown in these figures, additional headers could be provided above the metal sheet as it passes over first container 194. In the preferred embodiment, pumps 222a–222g collectively pump approximately 6270 gallons per minute of cooling fluid 253 through nozzles 102. Due to the construction of each nozzle 102 and the amount of fluid that is being pumped, each nozzle 102 will produce a column of cooling fluid 253 in a laminar, concentrated rod-like discharge pattern which has been found to be the most efficient manner in which to cool the metal sheet.

After cooling fluid 253 has been heated upon impact with the hot metal sheet, the heated water 263 will collect into first container 194. Although a portion of the heated water 263 is permitted to flow through slots 208 into second container 211, the majority of heated water 263 is drawn into third container 228 through one or more through holes 241. The majority of the fluid 256 within third container 228 is pumped by means of first or second recirculating pumps 245, 246 to heat exchanger unit 268. In the preferred embodiment, first and second recirculating pumps 245, 246 are similarly constructed and operate at approximately 3000 gallons per minute with only one pump running at a time while the other pump is on standby. Heat exchanger unit 268 operates in a conventional manner such that it receives fluid 265 and, after cooling the fluid, returns the fluid via a conduit (not shown) to second container 211. In the embodiment shown, heat exchanger unit 268 receives fluid 265 through pipe 272 which can be provided with a filter, such as a cyclone filter generally indicated at 274. At this point it should be noted that any residual that is washed from the metal sheet and which falls to the bottom of first container 194 will be permitted to be drawn into third container 228 since through hole 241 extends to base 251. On the other hand, slots 208 are raised from bottom 197 in order to minimize the flow of any such residuals into second container 211. As shown in FIG. 6, fluid 265 flowing through pipe 272 is first delivered to a transfer container 277 which is open to atmosphere and then is drawn into heat exchanger unit 268 through a pipe 281.

Again referencing FIGS. 4 and 5, first and second side pumps 249, 250 are also positioned within third container 228 and can draw fluid 265. In a manner similar to first and second recirculating pumps 245 and 246, only one side pump 249, 250 is adapted to operate at any given time with the other being on standby. In the preferred embodiment, side pumps 249 and 250 operate at approximately 1900 gallons per minute and deliver fluid 265 through respective pipes 288, 289 to a supply line 292. Attached to supply line 292 is a plurality of branch lines 295 which terminate in bifricated outlets 298. Bifricated outlets 298 are arranged to provide a transversely directed cooling flow upon the metal sheet.

The overall operation of cooling assembly 190 can be controlled in a manner known in the art. For instance, each of the pumps as described above can operate at the rate set forth above and the overall system can be controlled based on temperature readings taken, for instance, at the intake and outlet of heat exchanger unit 268, as well as within each of containers 194, 211 and 228. Since the specific controlling arrangement for cooling assembly 190 is known in the art, it will not be further discussed herein in detail. In addition, although described with respect to a preferred embodiment of the invention, it should be readily understood that various changes or modifications can be made to the invention as described without departing from the spirit thereof. For instance, although a particular construction for cooling assembly 190 has been described, it should be readily understood that nozzle 102 can be utilized in various other types of cooling arrangements for rolling mills while. In general, the invention is only intended to be limited by the scope of the following claims.

We claim:

1. In a hot rolling mill including a roller assembly through which a heated piece of metal is passed in order to produce a progressively thinned and elongated metal sheet which is subsequently cooling in a cooling zone of the rolling mill, a plastic nozzle arrangement for directing a flow of cooling fluid into a respective surface of the metal sheet within the cooling zone comprising:

an elongated, substantially cylindrical body portion having first and second ends, said body portion being hollow so as to provide for a longitudinally extending conduit defined by an internal surface portion of said body portion with the first end defining a cooling fluid intake port;

a head portion integrally formed with the second end of said body portion, said head portion including an internal flow channel defined by an inner surface portion that smoothly converges from the internal surface portion of said body portion to a cooling fluid outlet port; and an elongated baffle member positioned within and extending across said body portion.

2. The nozzle arrangement according to claim 1, wherein said baffle member extends from directly adjacent the first end of said body portion to directly adjacent the second end of said body portion.

3. The nozzle arrangement according to claim 2, wherein said baffle member comprises a unitary plastic member.

4. The nozzle arrangement according to claim 3, wherein said baffle member is X-shaped in cross-section.

5. The nozzle arrangement according to claim 1, wherein said head portion is integrally formed with a plurality of tool receiving flats and an externally threaded portion for securing said nozzle arrangement to a cooling header.

6. The nozzle arrangement according to claim 5, wherein said plurality of tool receiving flats are spaced about said cooling fluid outlet port and said threaded portion extends radially inwardly of said flats toward the first end of said body portion.

7. The nozzle arrangement according to claim 1, wherein said body and head portions are integrally formed from ABS plastic.

* * * * *